H. A. MARTIN.
CREDIT ACCOUNT REGISTER.
APPLICATION FILED APR. 6, 1916.

1,355,405.

Patented Oct. 12, 1920.

Inventor
HAAKON A. MARTIN

H. A. MARTIN.
CREDIT ACCOUNT REGISTER.
APPLICATION FILED APR. 6, 1916.

Inventor
HAAKON A. MARTIN

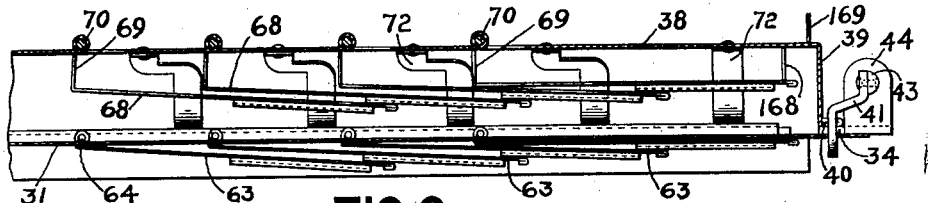
H. A. MARTIN.
CREDIT ACCOUNT REGISTER.
APPLICATION FILED APR. 6, 1916.
1,355,405.
Patented Oct. 12, 1920.
3 SHEETS—SHEET 3.
FIG.7
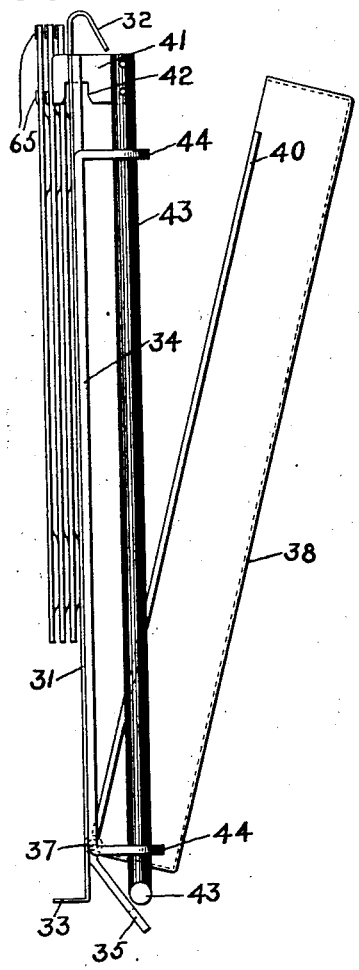
FIG.6
FIG.8
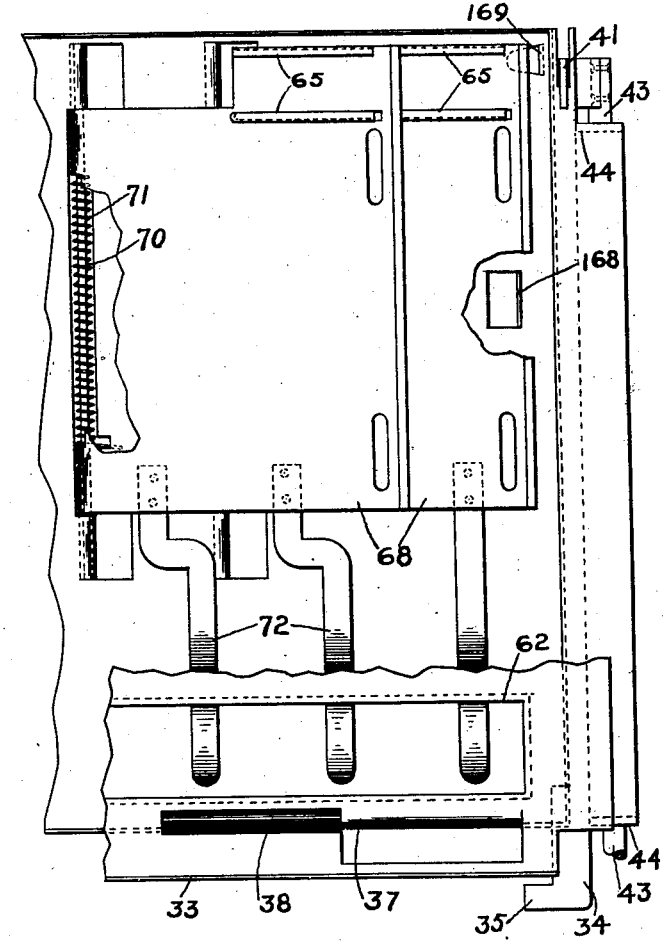
Inventor
HAAKON A. MARTIN
Attorneys

UNITED STATES PATENT OFFICE.

HAAKON A. MARTIN, OF DAYTON, OHIO, ASSIGNOR TO THE NATIONAL CASH REGISTER COMPANY, OF DAYTON, OHIO.

CREDIT-ACCOUNT REGISTER.

1,355,405.                    Specification of Letters Patent.    Patented Oct. 12, 1920.

Application filed April 6, 1916. Serial No. 89,270.

*To all whom it may concern:*

Be it known that I, HAAKON A. MARTIN, a citizen of the United States, residing at Dayton, in the county of Montgomery and State of Ohio, have invented certain new and useful Improvements in Credit-Account Registers, of which I declare the following to be a full, clear, and exact description.

This invention relates to filing cabinets and has more particular relation to filing cabinets of the class arranged for the filing of sales slips and the like, which are made out for separate transactions in retail stores, and filed separately according to the customer who makes the purchase or to whose account the transaction applies.

It is customary in a majority of retail stores to make out a sales slip from a charge book for all transactions belonging to a customer's account, whether it be a purchase to be charged, a payment on account, or credit to be given for goods returned. It is desirable of course to provide a filing cabinet in which the sales slips, pertaining to different accounts, may be readily filed.

Heretofore the filing cabinets generally employed in retail stores have been of such a nature that while the sales slips might readily be filed and classified, the filing system or cabinet provided no protection whatsoever to the proprietor of the store in which the cabinet was used.

It is one of the objects of the present invention to provide a filing cabinet which will not only afford a suitable place for filing sales slips pertaining to accounts, but it will also afford protection to the proprietor in that it will prevent access to all sales slips of past date while readily permitting the users of the files, that is the clerks in the retail stores, to ascertain the total of the account to date so as to enable the clerk to make out a sales slip for additional purchases or for transactions of other nature pertaining to the account.

In order to afford the desired protection to the proprietor it is found desirable to provide not only a temporary filing space or section in which the clerk handling the transaction will file the slips made out, but also to provide a filing space or section of a more permanent nature than the temporary file, in which permanent filing space sales slips may be put at the end of each day by either the proprietor, his manager or head clerk. It is desirable of course to have the permanent space inaccessible to the clerks in the store.

It is therefore one of the further objects of the invention to provide a file in which a permanent as well as temporary filing space is provided for each account, said filing spaces being so arranged as to render the permanent filing space inaccessible.

It is the further object to provide means whereby portions of the sales slip in the permanent filing section may be readily viewed by the clerks so as to enable them to ascertain the total of the account to date in filling out the new sales slip.

It is the further object of the invention to provide suitable locking means for rendering the permanent filing space inaccessible, said locking means being controlled by lock and key, controlled only by the proprietor or his manager.

It is not only the object of the invention to provide the several units, outlined above, but in the construction of the filing spaces so to arrange and construct the parts of the filing cabinet as to render the devices contained therein compact and efficient and also to produce a filing cabinet which is economic from a manufacturing standpoint and which will not only render the additional protection afforded by the present cabinet but will afford the protection and conveniences heretofore provided by filing appliances well known in the art.

With these and incidental objects in view the invention consists in certain novel features of construction and combinations of parts, the essential elements of which are set forth in appended claims, and a preferred form of embodiment of which is hereinafter described with reference to the drawings which accompany and form part of the specification.

Of said drawings:—

Fig. 6 is a horizontal sectional view of one of the filing units comprising the temporary and permanent filing sections showing the arrangement of the latching devices and filing spaces in both sections.

Fig. 7 is a detail end view of one of the filing units.

Fig. 8 is a partial front plan view of one of the filing units, the temporary section being broken away to expose the details of the permanent section.

Figure 1:
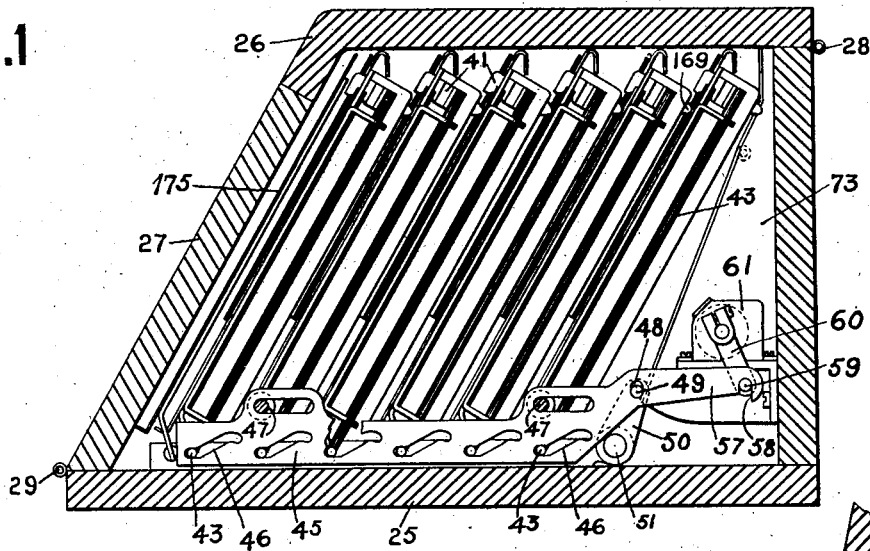
Figure 1 is a side plan view taken partly in section of the inclosing casing on the line 1—1 of Fig. 4 looking in the direction of the arrows and showing the right hand ends of all of the filing devices or units contained therein, as well as the latching means rendering the permanent filing sections inaccessible.

Referring to the drawings, 25 refers to the inclosing casing for the filing cabinet.

The inclosing casing, it is to be understood, may be of fire proof material or not as desired. The construction of the inclosing casing does not constitute part of the present invention and it is immaterial what materials are used in the construction of the same so far as the invention herein contained is concerned. It is preferred to provide the casing 25 with two hinged doors 26 and 27, hinged at 28 and 29 respectively, to the main body portion of the inclosing casing. It will readily be seen that the two doors 26 and 27 may be swung about their hinges 28 and 29 to the position shown in Fig. 2 to expose the filing units 30, within the cabinet, so as to render them easy of access and to permit the insertion of sales slips in the filing spaces.

Figure 2:
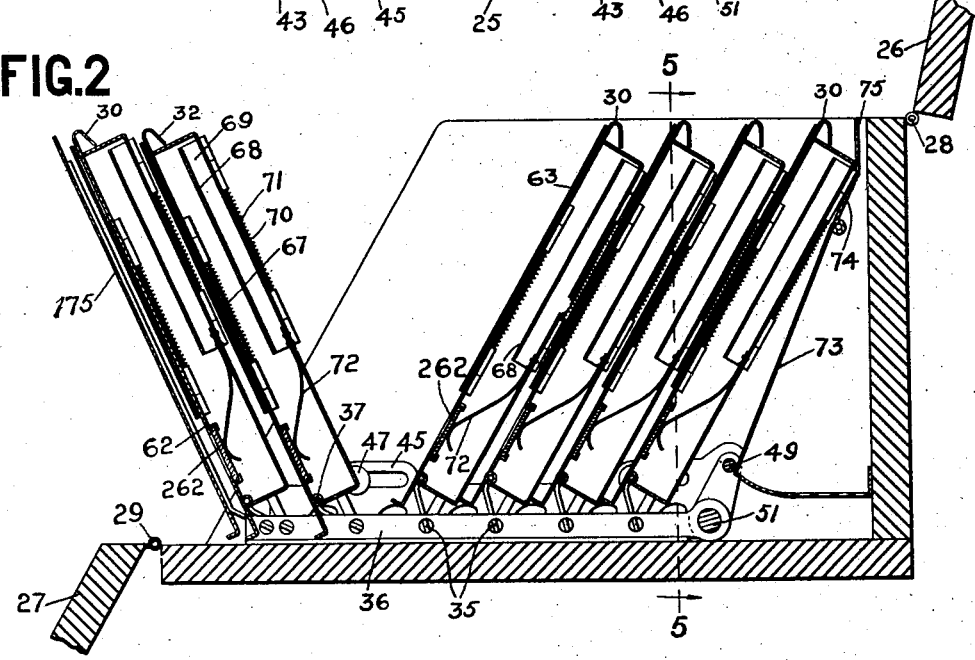
Fig. 2 is a cross section of the filing cabinet and all of the filing units contained therein, said section being on the line 2—2 of Fig. 4.

Referring particularly to Figs. 2 and 6 and as may also be seen from other figures of the drawings, the filing devices 30 each comprise a temporary filing section and a permanent filing section. The temporary filing section comprises a main plate or body portion in the desired form and comprising a flat piece of sheet metal 31 which is formed at its upper edge, as shown in Fig. 7, with a rearwardly and downwardly bent portion 32 forming a finger piece by which the filing units may readily be grasped when swinging the same about their pivots.

The plates 31 are provided at their lower ends with a forwardly turned ledge 33 which forms a rest for sales slips inserted in a temporary filing space. Each plate 31 is normally supported by two strips 34 (Fig. 7) one at each end of the plate 31 and provided at their lower ends with pivots 35, which are adapted to coöperate with pierced angle strips 36 fast on the base of the cabinet to form a pivot for the filing units. Pivoted at 37 on the rear side of the plates 31 is a permanent filing section 38, which is preferably formed of sheet metal and shaped to form a box having side walls 39 provided with outwardly turned flanges 40, which are in alinement with the strips 34.

The permanent filing sections 38 are normally adapted to be latched in the position relative to the plates 31 in which they are shown in Fig. 2, but they are capable of being swung about their pivots 37 to permit access to the slips contained within the permanent filing section, as shown in Fig. 7.

The means for normally latching the permanent filing section to the temporary filing section, in order to render the former inaccessible comprises a latching plate 41, guided in a slot in plate 31 (Figs. 4 and 8), and provided with a latching notch 42, which as shown in Fig. 1, is normally in position to hook over the strip 34 and plate 31 and the flange 40 of the wall 39 of the permanent filing section 38, thus holding the upper end of said permanent filing section latched to the temporary filing section and prevent the movement of the permanent filing section about its pivot 37.

Figure 4:
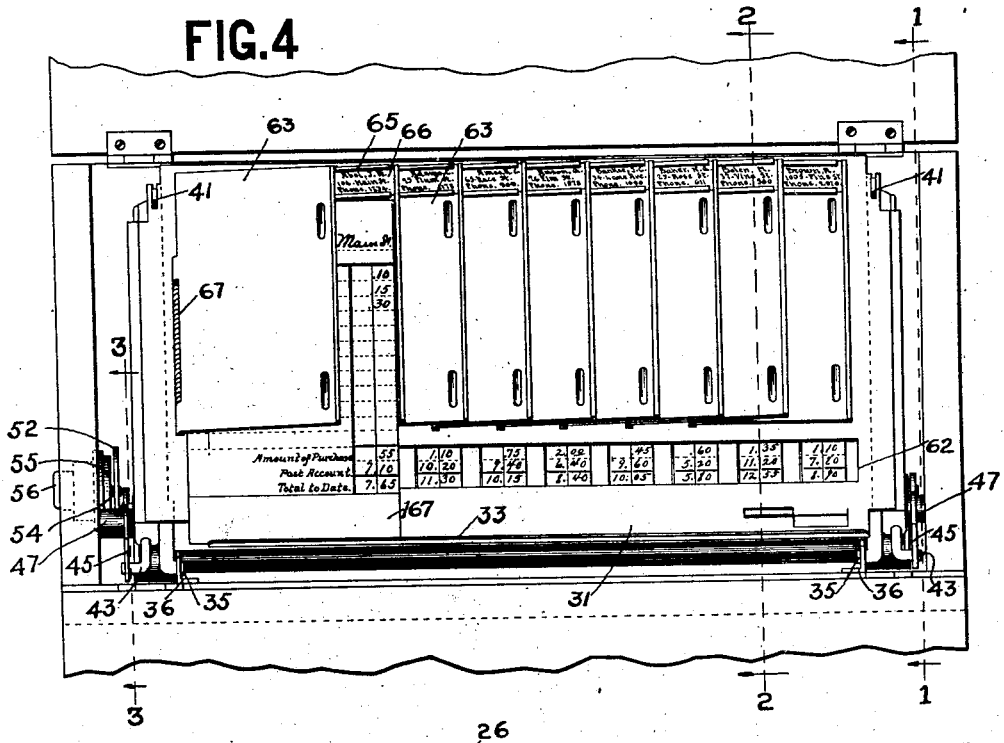
Fig. 4 is a front elevation of the filing units showing the individual account files of the temporary filing section and also showing the reading opening through which the past sales slips on file in the permanent filing section may be viewed.

The latching plate 41 is carried by the upper end of a rod 43, mounted to slide in ears 44, formed integral with the strips 34, at the ends of the plate 31, of the temporary filing section. A latching plate 41 is provided at each end of each filing section so as in each instance to insure the proper latching of the permanent filing section to the temporary filing section, as shown in Fig. 4. The rods 43 are turned outwardly at their lower ends to form pivotal points which in a normal position of the rods 43, which is the latching position, are in direct axial alinement with the pivots 35, of the temporary filing section. The out turned ends of the rods 43 coöperate with plates 45 located at either side of the filing section and provided with camming slots 46, into which said ends project. The said ends being in axial alinement with the pivots 35, no movement of the rods 43 relative to the filing sections will be affected when the filing sections are swung on the pivots 35.

Figure 3:
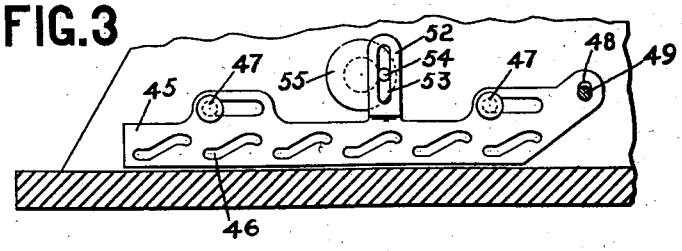
Fig. 3 is a detail sectional view on the line 3—3 of Fig. 4 showing the lock controlled slide which controls the latching means for the filing devices.
Figure 5:
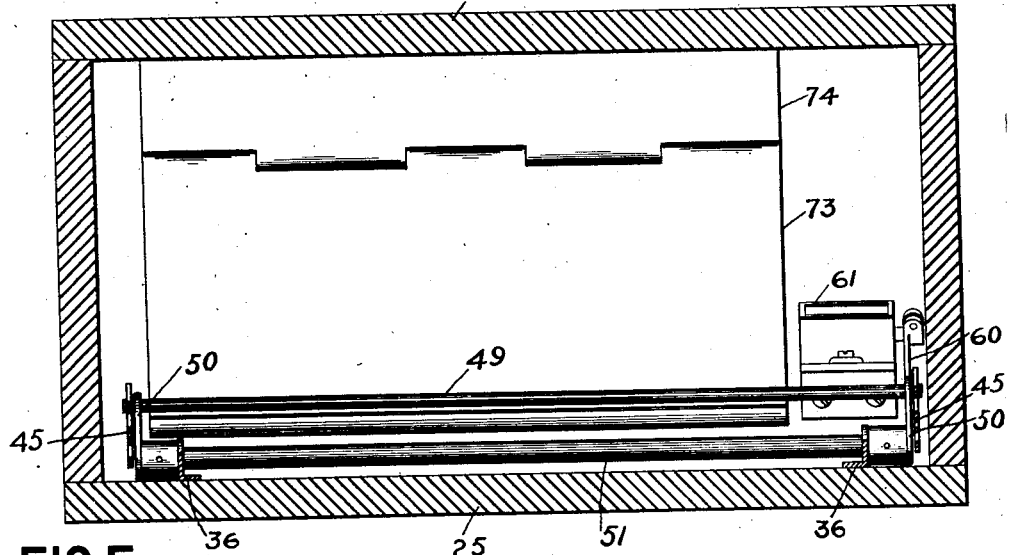
Fig. 5 is a sectional view taken on the line 5—5 of Fig. 2 and looking in the direction of the arrows, the filing units being omitted for the sake of clearness.

The plates 45 are slidably mounted at either side of the cabinet on studs 47, preferably carried by the vertical side plates of the inclosing casing. In a normal position of the plates 45, as shown in Figs. 1 and 3, the lower ends of rods 43 normally rest in the lower forward ends of the cam slots 46. The rear ends of each of the plates 45 are provided with a slot 48, through which projects a rod 49, carried by arms 50, fast on a cross rod 51, journaled in the rear ends of angle strips 36 (Figs. 1, 2 and 5). The left hand plate 45 (Figs. 3 and 4) is formed with an upwardly projecting arm 52, formed with a slot 53, into which projects a pin 54, carried by a plate 55, forming part of a key controlled lock 56. It will thus be seen that when the position of the lock plate 55 is as shown in Fig. 3 the plates 45 will be held in the rear position, shown in Figs. 1 and 3.

However, when the proprietor or his manager or chief clerk inserts a key in the lock 56 and turns the same the plate 55 will be partially rotated thereby sliding the plate 45 forward through the medium of the slot and pin connection 53 and 54. The forward sliding movement of the plate 45 will through the medium of the connection rod 49 slide the right hand plate 45 forward the same extent. When the plates 45 are slid forwardly, as just described, the cam slots 46, formed therein, will act upon all of the outturned lower ends of the rods 43 of all the filing units to slide said rods 43 upwardly in their bearings 44 thereby to elevate the locking plates 41 to disengage the latching notches 42 from the flange 40 of the permanent filing section 38 of each of the filing units. This will permit a swinging of the permanent filing sections 38 about their pivots 37 to permit access to the permanent filing section.

The right hand plate 45 is formed with a rearwardly extending branch 57, provided with a notch 58, coöperating with a pin 59 on a crank arm 60 of a well known form of step by step counters 61, although any other form of step by step counter may be used. By the provision of the step by step counter 61, which it will be seen will be operated upon every sliding movement of the plates 45, the proprietor or his manager is able to tell whether or not some one has tampered with the devices in their business.

It is desirable of course while rendering the permanent filing section inaccessible, to provide means whereby a portion of the top sales slip in the permanent section may be viewed by the clerks so as to enable them to use the figures indicating the account to date in making up the sales slip for the new transaction. To permit the reading of totals to date each of the plates 31 of the temporary filing section is provided with a protected sight or reading opening 62, which is directly over the portion of the sales slips in the permanent filing section which bears the totals representing the last transaction, that is the amount of the last purchase, the past account, and the total to date, which represents the past account total which is used in making up the sales slip for the new transaction. It is preferable of course to cover the opening 62 with either glass or some other transparent material 262 so as to prevent changing the totals on the slips in the permanent filing section of the filing units.

Thus far the filing units have been described in a general way and so far as the description of the invention brought out above is concerned the filing units might be used for a single account without departing from the present invention. It is desired, however, to show in the present embodiment of the invention filing units having sections which are capable of providing spaces for a number of customers' accounts. As shown in Fig. 4 each of the filing units is capable of handling eight accounts, the same provision being made in both the temporary section and the permanent section of the filing units. In order to hold the sales slips of each account separately and also to prevent the slips being dislodged by rough handling of the filing units means are provided for holding the slips 167 in the position, shown in Fig. 4. In the temporary filing section of a unit the holding means, as illustrated in Figs. 4, 6 and 8, comprise plates 63 pivotally mounted on the plate 31 at 64. Each of the plates 63 except the left hand plate, shown in Fig. 4, is provided at its upper portion with a pocket comprising rolls 65 struck up from the plates 63 and adapted to hold a label 66 which stands just above the figure column on the sales slip 167 to indicate the account to which that particular space or pocket is allotted. The plates 63 are held in the position shown in Figs. 2, 4 and 6 by coiled springs 67 wound about the pivots 64 and having their ends anchored in the same manner as hereinafter described with reference to the pockets of the permanent filing section. The action of the springs is to hold the plates 63 in the position shown in the figures and thus press them against the inserted sales slips to hold the latter in position.

It will be noted in Fig. 4 that the leaves 63 are made of sufficient length to extend to a point just above the openings 62 in the plate 31 of the temporary filing section. When the sales slip 167 is inserted behind one of the leaves or plates 63 it will rest on the ledge 33 formed on the forward sides of the plates 31 and in this position will cover the total figures shown on the transaction sales slip of the corresponding pocket in the permanent filing section of the filing unit. This is desirable although not essential, being desirable from the point of avoiding confusion in the total figures so that if two purchases or two transactions pertaining to a single account are had in one day there is no chance for the clerk, handling the last transaction, reading the total through the opening 62 instead of reading the total on the sales slip made out earlier in the day and still resting in the proper pocket in the temporary filing section of the filing unit.

The pockets in the permanent filing section of the filing unit are formed in the same manner as the pockets in the temporary filing section with one exception. It is obvious of course that as the sales slips are transferred from the temporary to the permanent filing section at the end of each day, there will be an accumulation of sales slips in the permanent filing section of the unit. It is therefore necessary to construct the pockets in the permanent filing section in such a manner as to give them a greater filing capacity than the pockets in the temporary filing section. In order to give them the increased capacity the leaves or plates 68 are formed with flanges 69 which coöperate with the pivots 70 on the plates 68 of the permanent filing section, the flange 69 being constructed to provide a greater filing space between the leaves or plates 68. The leaves 68 of the permanent filing section are provided with springs 71 which surround pivot pins 70 for each of the plates 68 and having their ends anchored as shown in Fig. 8 and acting in the same manner as do the springs 67 of the plates of the temporary filing section to hold the sales slips contained in the permanent filing section to prevent the same from being dislodged by rough handling of the units.

In order to provide a rest for the right hand leaf 68 in each of the permanent sections, rests 168 are struck inward from the back plate of the permanent filing sections 38.

Ears 169 are also struck therefrom to provide spacers between the units so as to prevent the springs 71 of one unit striking the leaves 63 of the adjacent unit.

When the sales slips are inserted in the permanent filing pockets it is obvious that unless means were provided to overcome the condition, the lower portion of the slip would normally be some little distance from the opening 62 (Fig. 2). In order to hold the slips when inserted in the permanent filing section against the opening 62 so as clearly to exhibit the totals on the sales slips a leaf spring 72 is provided for each pocket of the permanent filing section, said springs 72 being mounted on the rear wall of the permanent filing section and having their lower ends resting against the covering of opening 62 (Fig. 2) in a position which will be just behind the section of the inserted sales slips bearing the totals, thus holding any slips, which may be inserted, against the opening so that they may be readily seen.

It is customary in retail stores when goods are sent "C. O. D." to send the bill, which is one copy of the sales slip, to the customer with the goods, when delivered, a duplicate of the bill or sales slip being retained in the store. It is found that there is quite a loss in retail stores by reason of the duplicates, which are retained in the store, becoming lost. In order to provide a convenient place for storage of duplicate sales slips on "C. O. D," the filing cabinet is provided with a pocket formed in the rear part of the casing or cabinet just behind the rearmost filing unit 30, said pocket being formed preferably with the sheet metal frame or box 73 carrying a pivoted lid 74 which is formed to leave an opening 75 when in closed position to permit the insertion of the duplicate of the "C. O. D." slips into the pocket. This lid 74 may be under a lock and key if desired. When the driver returns from his trip it is customary to remove the duplicates of "C. O. D." sales slips from the pocket so as to check the accounts with the driver. On those "C. O. D." sales for which the driver does not obtain the cash payment, the duplicate sales slip is retained and is generally filed in the proper pocket of the filing units, one of said units being generally provided for such purposes as "C. O. D." sales on which payment is to be made as is usually done with cash customers other than those customers who run a charge account with the proprietor of the store.

If desired a front plate 175 may be provided to cover over the pockets and slips of the foremost unit although this may be dispensed with if desired. The plate 175 is pivoted, in the same manner as the units, on the angle strips 36.

In the use of the machine it is customary to write out the duplicate sales slip at the time a transaction is made. The sales slip usually consists of itemizing the purchases made by the customer and the transaction is totaled on the line shown on the sales slip 167 in Fig. 4, which bears the legend "Amount of purchase." If the customer is a charge customer then the clerk making the sale will refer to the pocket assigned to the account of that customer. He will glance at the point of the pockets where the totals on the sales slip would appear. If there is no sales slip in the pocket for that customer in the temporary filing section of the unit the portion of the sight opening 62 appropriate to that customer will be exposed and if there is a past total of that account the clerk will observe the past account and will enter that amount on the line beside the legend "Past account" as indicated on the slip 167 (Fig. 4). He will then compute the total to date and enter the same upon the line beside the legend "Total to date" as noted on the sample sales slip. A copy of the charge sales slip will then be handed to the customer while a duplicate of the sales slip will then be filed in the pocket of the temporary section, which is assigned to that customer's account. At the end of the day it is desirable that the proprietor check over the cabinet and he is enabled to ascertain just which customers purchased goods on account during the day by observing those pockets of the temporary section which contain sales slips. By rocking the units 30 one after the other about their pivots 35 the proprietor can tell at a glance what his charge business has been during the day. In glancing over the charge business he will, when a slip is found in the pocket of the temporary filing section, remove the slip and compare the totals shown on the slip, which he removed, with the totals showing through the opening 62 on the past sales slips for the same account so as to check the clerk and show up any error which is made in carrying forward the total of the past account. Finding the totals on all slips correct the proprietor will then insert his key in the lock 56 and turn the same thereby sliding both the plates 45 forward, thereby elevating the rods 43 and disengaging all of the locking plates 41 so as to unlatch the permanent filing sections from the temporary filing sections to permit access to the permanent section. The sales slips in the pockets of the temporary sections will then be removed and transferred to the corresponding pockets of the permanent section. After all of the sales slips have been thus transferred the lock 56 is again operated thereby sliding all the plates 45 rearward to lower the rods 43 and thereby bring the locking plates 41 again in locking position. It will of course be remembered that when the plates 45 are thus reciprocated a single unit is added on the step by step counter 61 so as to retain a record of the number of times the permanent filing sections have been rendered accessible.

In describing the construction of the present filing cabinet it is to be understood that some of the details such as the lock, step by step counter, etc., are shown merely in the preferred form. Other forms of locks and counters and other details of construction might be employed without in the least departing from the spirit of the present invention.

It is the spirit of the present invention to provide the protection which the permanent filing section gives to the proprietor by preventing access to the sales slips of an account so as to prevent collusion between a customer and the clerk should the customer complain to the clerk that he is unable to pay his account to the extent of record. It frequently has been found that clerks under such conditions will agree to destroy some of the sales slips of the past account so as to indicate an improper total. The provision of the permanent filing section however will prevent access to the past sales slips of the account and thus prevent the improper destruction of the records of the transaction.

By the provision of the permanent filing section directly associated with the temporary filing section it provides but a single point at which a clerk must look to determine the totals to be handled in the transaction. If no sales slips have been made out during the day the total of the past accounts of former days will be exhibited at the very same point where the totals on the slips of the same day will be exhibited thus rendering it unnecessary for a clerk to look at different places in the cabinet to determine the past account. It also facilitates the checking by the proprietor as all that is necessary is simply to slide the sales slip 167 upward in its pocket of the temporary section, thus exhibiting both the totals on the sales slips in the permanent filing section as well as the totals of the sales slip in the temporary filing section so as to permit a convenient check of the totals to see that the proper totals were brought forward.

While the form of mechanism herein shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

It is obvious that the rest 33 of the temporary filing section might well be placed above the sight opening 62 without departing from the spirit of the invention. In this position of the rest the sight opening will not be covered when slips are inserted in the pockets of the temporary section.

What is claimed is:—

1. In a filing cabinet, the combination of two series of filing sections of different classes, each section of one class being pivotally mounted on a section of the other class, and means for rendering the sections of one class inaccessible.

2. In a filing cabinet, the combination of two series of filing sections of different classes, each section of one class being mounted in such relation to a section of the other class as to render the two capable of movement as a single unit, and means coöperating with the sections of each pair for rendering one of said sections inaccessible.

3. In a filing cabinet, the combination of two series of filing sections of different classes, each section of one class being mounted on a section of the other class, and means coöperating with the sections of each pair for rendering one of said sections inaccessible.

4. The combination of a filing unit comprising a plurality of sections, and latching means for normally latching said sections together whereby certain of said sections may be rendered inaccessible.

5. The combination of a filing unit comprising a plurality of sections, latching means for normally latching said sections together whereby certain of said sections may be rendered inaccessible, and means for disabling said latching device at will.

6. In a filing device, the combination of a plurality of filing units each comprising a plurality of sections, latching means for each of said units normally latching the sections of each unit together whereby certain of said sections of each unit may be rendered inaccessible, and means common to all of said latching devices for disabling all of said devices at will.

7. The combination of a filing unit comprising two sections pivoted to permit of relative movement, latching means normally preventing said movement whereby one of said sections is rendered inaccessible, and means for disabling said latching device at will.

8. The combination of a filing unit comprising two sections, one of said sections being pivotally mounted on the other of said sections to permit of relative movement, and latching means normally preventing said relative movement whereby one of said sections is rendered inaccessible.

9. In a filing cabinet, two series of filing sections of different classes, each section of one class being mounted in relation to a section of the other class so as to render the two capable of movement as a single unit, and means coöperating with said sections and combining with said relative mounting to render the sections of one series inaccessible.

10. In a filing cabinet, two series of filing sections of different classes, each section of one class being pivotally mounted upon a section of the other class, and means carried by the sections of one class and coöperating with the sections of the other class for rendering the sections of one class inaccessible.

11. In a filing cabinet, two series of filing sections of different classes, each section of one class being mounted upon a section of the other class, and means carried by the sections of one class and coöperating with the sections of the other class for rendering the sections of one class inaccessible.

12. The combination of a filing unit, comprising two sections mounted to permit relative movement, latching means normally preventing said movement whereby one of said sections is rendered inaccessible, and means for disabling said latching device at will, said means comprising a slidable member engaging said latching means.

13. The combination of a filing unit, comprising two sections mounted to permit relative movement, latching means normally preventing said movement whereby one of said sections is rendered inaccessible, and means for disabling said latching device at will, said means comprising a key operated slidable member engaging said latching means.

14. The combination of a filing unit comprising two sections, latching means normally latching said sections together whereby one of said sections is rendered inaccessible, and a sight opening in the accessible section permitting a view of the contents of the inaccessible section.

15. The combination of a filing unit comprising two sections one pivotally mounted upon the other, latching means normally latching said sections together whereby one of said sections is rendered inaccessible, and a sight opening in one of said sections permitting a view of the contents of the inaccessible section.

In testimony whereof I affix my signature.

HAAKON A. MARTIN.